April 4, 1961 R. J. MAZZONI 2,977,722
METHOD OF SEALING GLASS TO OTHER ELEMENTS
Filed March 5, 1959
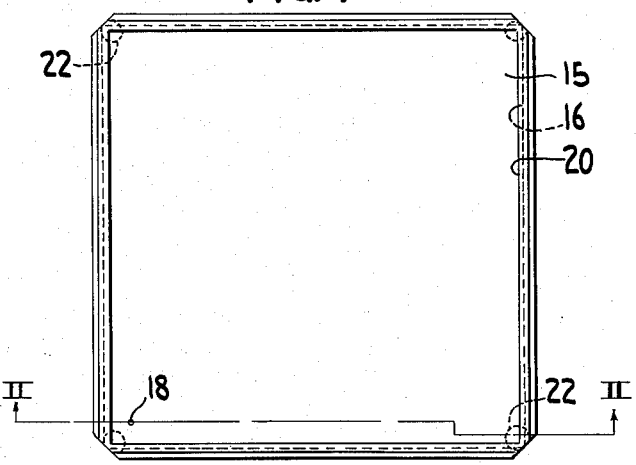
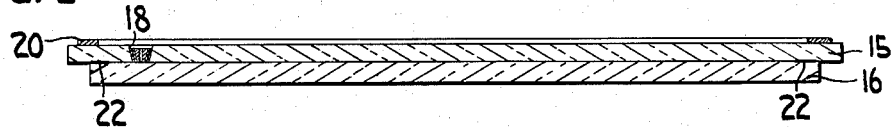
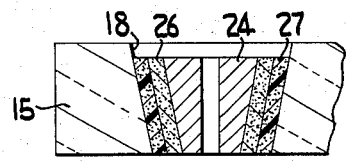
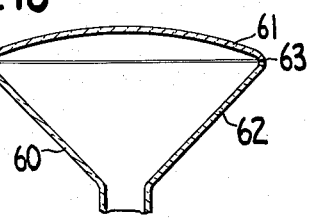
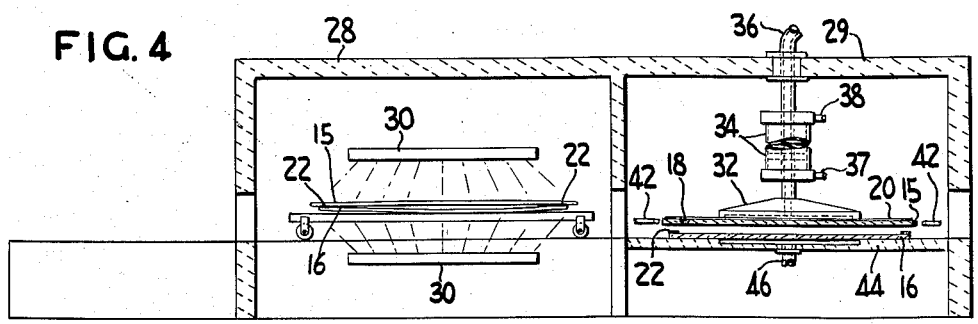
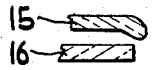 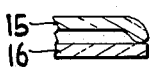
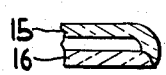 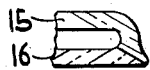
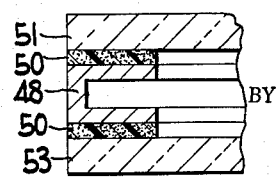
INVENTOR.
RENATO J MAZZONI
BY
Oscar L. Spencer
ATTORNEY

United States Patent Office 2,977,722
Patented Apr. 4, 1961

2,977,722

METHOD OF SEALING GLASS TO OTHER ELEMENTS

Renato J. Mazzoni, Tarentum, Pa., assignor to Pittsburgh Plate Glass Company, Allegheny County, Pa., a corporation of Pennsylvania Filed Mar. 5, 1959, Ser. No. 797,474

4 Claims. (Cl. 49—82)

The present invention relates to a method of sealing a glass element to another element and it has particular relation to a method of assembling the elements, transferring them and heating them to seal them together.

It is well known that glass can be sealed to glass, metal or other material by means of a low softening point fusing glass. For example, conventional lime-soda-silica sheet or plate glass is sealed to glass or metal parts in the formation of multiple glazed units, cathode-ray tubes and other structures composed in part or wholly of glass.

In sealing glass to other elements, the various parts are assembled in juxtaposition at room temperature and then transferred to heating zones where they are heated to seal the parts together. Frequently, the parts to be sealed move relative to each other between the times of assembly and sealing. This relative movement may be caused during the transportation of the assembly to or in the heating furnaces. It may also occur as a result of thermal expansion of the parts during the heating prior to sealing.

Such relative movement of the parts results in improper alignment and fusion of the parts and consequent rejection of the completed article. It is, therefore, an object of the present invention to provide a method of assembling, transporting and heating glass and the elements to be sealed thereto to prevent misalignment thereof during the transportation steps prior to sealing.

In accordance with this invention, such a method is provided by employing a combination of a polybutene and a low softening point glass to maintain the elements in place during the various transportation steps between the time of assembly and sealing of the respective parts of the structure. The polybutene is tacky and adhesive at room temperature and serves to adhere the glass and other elements in their assembled position at room temperature and during transportation to the heating zone and during the preliminary heating of the assembly in the heating zone. The polybutene burns off at a temperature just below the softening temperature of the low softening point glass and prior to the sealing of the parts by means of the softened, tacky, low melting point glass. The polybutene leaves no residue and in no way impairs the formation of a good seal.

The invention is applicable to the sealing of glass to other elements wherein the fusing glass forms the connection or wherein the connection is primarily formed by softening and welding of the glass to the other element. The invention may be further described in conjunction with the description of the drawings in which:

Fig. 1 is a plan view of a pair of glass sheets assembled preparatory to having their edges fused together to form a multiple glazed unit;

Fig. 2 is a sectional view taken along lines II—II of Fig. 1;

Fig. 3 is an enlarged portion of Fig. 2 illustrating an assembled pore closure structure for a multiple glazed unit prior to sealing thereof in the pore opening;

Fig. 4 is an elevation illustrating the heating furnaces employed in sealing the elements together and particularly shows the movement of the glass sheets shown in Fig. 1 during preheating thereof in their manufacture into a multiple glazed unit and the position of the glass sheets prior to having their edges fused together to form a multiple glazed unit;

Figs. 5 to 8 inclusive are partial sectional views of the glass sheets illustrating the section of the edges thereof during the welding operation;

Fig. 9 is a fragmentary sectional view illustrating another type of multiple glazed unit which can be produced in accordance with the present invention, and Fig. 10 is a view partly in section illustrating the application of the invention to the formation of a cathode-ray tube.

The invention may be described in conjunction with Figs. 1 to 8 with respect to the formation of an all glass, multiple glazed unit. An example of such a process is described in detail in copending application of John M. Fisher, Serial No. 491,109, filed February 28, 1955, now abandoned. In such process, the marginal edges of the sheets are fused together. The heating of the edges of the glass is effected by localized electrical heating. In order to initiate the electrical heating, a peripheral stripe of an electrically conductive material, such as colloidal graphite, is applied on the top surface of the upper sheet of glass near the edges of the sheet. Electric current is then passed through the stripe to effect heating of the stripe and the glass immediately adjacent thereto. As the temperature of glass rises in the vicinity of the stripe, the glass becomes a conductor and the electrical heating can be continued in the glass after the electrically conductive stripe has been burned away. The invention is applicable to other methods of forming multiple glazed units but such method is illustrated for purposes of describing the invention.

In the above described method of making all glass welded, multiple glazed units, the glass sheets 15 and 16 are washed, striped, preheated and then welded. In Figs. 1 and 2 of the drawing, sheets 15 and 16 which have been cleaned, striped with an electrically conductive material and placed in position, one above the other in touching relationship, are shown. The glass sheets 15 and 16 may be of the same size but it is preferred that upper sheet 15 be a little larger than lower sheet 16 so that it extends out equally over the edges of sheet 16 on all sides. The corners of the top sheet 15 may be cut off. The top sheet contains a pore opening 18 near one corner thereof.

The edges of sheet 15 on the top surfaces thereof are striped with an electrically conductive material such as colloidal graphite. The stripe 20 is approximately ¼" in width and extends around the periphery of the sheet. In between the sheets 15 and 16 at the four corners thereof, are small dabs 22 of a glass frit-polybutene composition suitable for holding the sheets 15 and 16 in proper alignment prior to welding of the sheet in accordance with the present invention.

The polybutene-glass frit composition is employed in the form of a dispersion of powdered glass frit in liquid polybutene. The composition is tacky and adhesive at room temperature. Usually, the frit is employed in a ratio of 1 part frit to about 1 to 3 parts by weight of polybutene. Other mixtures may be employed depending upon the viscosities and modes of application desired.

The term "polybutene" is intended to include polymers or copolymers of monoolefins containing 4 carbon atoms such as isobutylene, butene-1 and butene-2. These polymers or copolymers may be polymers or copolymers of the pure compounds or may be polymers or copolymers of unsaturated 4 carbon atom fractions resulting from petroleum distillations. The polybutenes which have been found to be useful in the practice of the invention are low molecular weight liquid polybutenes having a molecular weight between 300 and 15,000. These polybutenes are tacky at room temperature and combust and disintegrate into vapors at a temperature of about 650° to 700° F. For example, a preferred embodiment of the invention utilizes a polybutene having a molecular weight of about 840 (Oronite-24), whereas another form of the invention utilizes polymers of polyisobutylene having a molecular weight of about 10,000 (Vistanex). It is to be understood, of course, that the properties of the mixture of polybutene and glass frit may be altered depending upon their mode of application and particular use.

The fusing or sealing glass must satisfy a number of requirements. It must have a linear coefficient of thermal expansion which is compatible with that of conventional lime-soda-silica window or plate glass. The glass must have good chemical durability and should have a low softening point so that the sheet glass will not be distorted when fused to other objects. Glasses which have been found to exhibit these properties consist essentially of 65 to 80 percent by weight of PbO, 5 to 20 percent by weight of $B_2O_3$, 0 to 15 percent by weight $Al_2O_3$ and 0 to 15 percent by weight $SiO_2$. Examples of such glasses are set forth in the table below:

| Glass Compositions | Percent by Weight Constituents | | | | |
| --- | --- | --- | --- | --- | --- |
| | 2 | 3 | 4 | 5 | 6 |
| PbO | 72 | 74 | 68 | 75 | 73 |
| $B_2O_3$ | 14 | 15 | 14 | 11 | 11 |
| $SiO_2$ | 14 | 11 | 14 | 3 | 0 |
| $Al_2O_3$ | 0 | 0 | 4 | 11 | 11 |
| Softening Point, °C | 477 | 466 | 499 | 440 | 438 |
| Linear coefficient of Thermal Expansion×$10^{-6}$ per °C. between 25° C. and 300° C. | 8.37 | 8.40 | 7.45 | 8.50 | 8.50 |

As stated, these glasses are designed for use with conventional lime-soda-silica sheet glasses which contain 50 to 75 percent by weight $SiO_2$, 10 to 18 percent by weight alkali metal oxide, 5 to 16 percent by weight of alkaline earth metal oxide and 0 to 20 percent by weight $Al_2O_3$. Such glasses have softening points between 650 to 760° C. and linear coefficients of thermal expansion of 7.0 to $9.0 \times 10^{-6}$ per °C. between 0 and 300° C.

Another form of the invention is illustrated in Fig. 3.

In this figure is shown a metal eyelet 24 having a coating of glass frit 26 such as described above fused to the periphery thereof. The coated eyelet is to be used as a pore closure structure in the pore opening 18. The coated eyelet 24 is secured in the pore opening prior to heating by means of a glass frit-polybutene adhesive 27 such as described above. The polybutene adheres the coated eyelet in the pore opening until a time just prior to the application of sufficient heat to fuse the eyelet to the walls of the pore opening by means of the fusion glass 26.

The manner in which the embodiments of Figs. 1 to 3 are employed in the practice of the invention are now described in further detail in conjunction with the description of Figs. 4 to 8. After being striped, the sheets are aligned in superposed touching relationship as shown in Fig. 2. Thereafter, they are transported into a furnace 28 to heat the glass sheets to a temperature of about 1000° F. so as to prepare the sheets for the localized edge heating. This step is necessary to prevent breaking of the glass during the welding operation due to differences in temperature throughout the sheet. During the transportation into the preheating furnace 28, the tacky polybutene serves to keep the sheets in proper alignment and also to keep the coated eyelet 24 firmly set in the pore opening.

The preheating may be done in the same chamber as the welding, but it is preferred as shown in Fig. 4 to conduct the welding operation in an additional chamber 29 so that one set of glass sheets can be preheated in chamber 28 while another set is being welded in chamber 29. The operation is thus carried out more efficiently. As shown in Fig. 4, the glass sheets are heated by means of radiant heaters 30 positioned above and below the superposed sheets. During the initial stages of the preheating, the glass sheets tend to bow in the direction of the heating source closest to the surface of the sheet. During this bowing, the polybutene holds the sheets in alignment and the eyelet 24 properly seated in the opening 18. As the sheets begin to become uniformly heated throughout, the stresses initially set up therein are readjusted and relieved and the sheets return to their original position. By this time, the polybutene material has completely burned away and the low softening point fusing glass has become tacky and acts as the adhesive. The polybutene is completely burned away before the frit becomes tacky and thus none of it is entrapped in the assembly.

The preheated sheets are next transported to the welding furnace. During this transportation step, the low softening point sealing glass serves to maintain the glass sheet and metal eyelet in proper alignment and position. The sheets are spaced a slight distance in the welding furnace for the welding operation.

In Fig. 4, a suitable holding device such as a vacuum chuck 32 is shown. It is mounted in operable connection with cylinder 34. The vacuum chuck is lowered to engage the top surface of sheet 15, a vacuum is applied to the chuck through line 36 and the chuck and glass attached thereto are raised a slight distance, for example, $\frac{1}{16}$ of an inch above sheet 16. The distance between the sheets 15 and 16 when they are in position for welding is less than the final distance desired between the sheets in the welded unit. This distance is increased during the welding and filleting steps as described below. The vacuum chuck is raised and lowered by means of air flowing through lines 37 and 38 against piston 39 mounted within the cylinder 34.

Electrodes 42 are moved into close proximity with the stripes 20 at the corners of the sheet 15 so that electric current can be passed from the electrodes through the stripes. The electrodes need not make physical contact with the stripe. The passage of the current through the stripes causes the stripes to heat up and heat the glass adjacent thereto. As the temperature of the glass adjacent the stripe begins to rise, the glass in this localized area becomes a conductor of electricity. The glass slowly becomes hotter and begins to droop as shown in Fig. 5. By this time, the conductive stripe usually has burned off. In Fig. 6, the edges of the sheet 15 have contacted the edges of sheet 16 and in Fig. 7, they have begun to flow over the edges of sheet 16. At this point, the glass in the edges of the sheet 16 is sufficiently hot to conduct current and fusion of the edges of the two sheets is achieved.

When the edges of the sheets 15 and 16 are thoroughly fused together, the sheet 15 may be raised by means of vacuum chuck 32 so as to pull the fused edges upwardly. Sheet 16 is maintained in place on supporting platen 44 by means of vacuum applied through line 46. The spacing of the sheets after being pulled apart may vary between $\frac{1}{8}$ to $\frac{1}{4}$ of an inch and is usually about $\frac{3}{16}$ of an inch. The current is then turned off. The pressure within the unit is increased suddenly so as to fillet out the fused edges of the unit to form a smooth, rounded interior edge surface. This is shown in Fig. 8.

After suitable setting up time has elapsed, the units are transferred to a lehr for annealing. The opening in the metal eyelet or in the pore hold permits equalization of pressure inside with that outside of the unit during cooling. During the welding of the edges, the heat created in the edges of the glass sheet 15 together with some additional heat from a gas burner directed over the pore hole provides sufficient heat to fuse the metal eyelet 24 to the walls of the pore opening 18. The opening in the eyelet or in the pore opening 18 is sealed after the unit is cooled.

A further application of the invention is shown in Fig. 9 which shows an assembly prior to final sealing. In this application, a metal spacer element 48 of U-shaped cross-section is adhered by means of a glass frit-polybutene composition 50 to the edges of glass sheets 51 and 53 to form an assembly suitable for making a multiple glazed unit. Here, as in the embodiment shown in Fig. 3, the glass frit-polybutene composition is employed to maintain the element 48 in line with the edges of the glass sheets 51 and 53 during transportation of the assembly into a heating furnace and up to the time of fusion of the glass frit of the mixture to seal the metal spacer element 48 to the edges of the sheets. The polybutene is completely decomposed and burned away prior to the final sealing of the low melting glass frit to the spacer element 48 and edges of the glass sheets 51 and 53. A single heating step is sufficient to make the unit. The assembly is heated to a temperature sufficient to render the glass frit tacky and continuous after the burning out of the polybutene.

Another application of the invention is shown in Fig. 10. This application is concerned with the formation of a cathode-ray tube 60. The cathode-ray tube is composed of a face plate 61 sealed to a glass or metal cone 62 at the edges of the face plate by means of a glass frit-polybutene composition 63. The cone and face plate are assembled and then transported to a furnace wherein the assembly is heated to cause the face plate to be permanently bonded to the cone. The sealing of the face plate to the cone may be accomplished in the same manner as the sealing of the sheets 15 and 16 in Figs. 1 to 8 inclusive or sheets 51 and 53 to metal spacer element 48 in Fig. 9. Dabs of the glass frit-polybutene composition may be employed to maintain the face plate and metal cone in alignment as in the process shown in Figs. 1 to 8 and the edges of the face plate are then locally heated to cause them to soften and fuse to the metal cone. The face plate may be adhered to the metal cone completely by the low melting glass as in the embodiment shown in Fig. 9.

By use of the present invention, a means for assembling and sealing a glass part to another element without misalignment thereof prior to sealing has been accomplished. The polybutene acts to maintain the glass and other elements in alignment during transportation of the assembly and up to a temperature of about 600° F. during heating of the assembly. The polybutene begins to burn off at about 600° F. The low softening point sealing glass becomes tacky at about 850° F. and further acts to maintain the glass and other elements in position until the final sealing of the glass to other glass or metal elements. Such method has greatly reduced the number of sealed or welded structures which have been rejected in production because of sealing while misaligned.

Although the present invention has been described with respect to specific details of certain embodiments thereof, it is not intended that such details act as limitations upon the scope of the invention except insofar as set forth in the accompanying claims.

This application is a continuation-in-part of my co-pending application Serial No. 528,886, filed August 17, 1955, now abandoned.

I claim:

1. A method of joining a glass element to another element which comprises assembling the elements and adhering them together at room temperature with a binder composed of a polybutene and a low softening point glass, said binder being tacky and adhesive at room temperature, transferring the assembly to a heating zone, heating the assembly to a temperature which is sufficient to decompose and burn off the polybutene and render the low softening point glass tacky and adhesive and cooling the assembly to form a composite article.

2. A method of joining a glass element to another element which comprises assembling the elements and adhering them together at room temperature with a binder composed of a polybutene and a low softening point glass, said binder being tacky and adhesive at room temperature, transferring the assembly to a first heating zone, heating the assembly to a temperature which is sufficient to decompose and burn off the polybutene and render the low softening point glass tacky and adhesive, but below the softening temperature of the glass element, transferring the heated assembly to a second heating zone, heating portions of the glass element to a temperature sufficient to soften these portions and cause them to weld to the other element and cooling the composite article.

3. A method of making a double glazed unit having a pore opening in it which comprises providing a pore opening in one of the two sheets of glass, suspending a metal eyelet in the pore opening at room temperature by means of a binder composed of a polybutene and a low softening point glass, said binder being tacky and adhesive at room temperature, transporting the said sheet and eyelet into a heating zone, heating the assembly of the sheet and the eyelet to a temperature which is sufficient to decompose and burn off the polybutene and render the low softening point glass tacky and adhesive and thereby hold the eyelet in place in the pore opening, but below the softening temperature of the glass sheets, transferring the heated assembly to a second heating zone and into spaced relation to a second sheet of glass for welding, heating the edges of the glass sheets to a temperature sufficient to soften them and cause them to weld to each other while maintaining the central portions of the sheets in spaced relation, and cooling the double glazed unit thus formed.

4. A method of making a double glazed unit which comprises placing one sheet on top of and in touching relationship with the other sheet of glass with the edges of the sheets being aligned with each other, said sheets having a binder composed of a polybutene and a low softening point glass at isolated spots along the edges of the aligned sheets between the sheets, the binder being tacky and adhesive at room temperature so as to adhere the sheets together and maintain them in proper alignment during subsequent transfer, transferring the aligned sheets to a preheating zone, preheating the glass sheets while they are maintained stationary in the preheating zone to a temperature sufficient to decompose and burn off the polybutene and render the low softening point glass tacky and adhesive, but below the softening temperature of the glass sheets, transferring the preheated sheets to a welding zone, separating the sheets, heating the edges of the top sheet to cause them to soften, drop and fuse to the edges of the bottom sheets to form the double glazed unit and cooling the unit.

References Cited in the file of this patent

UNITED STATES PATENTS

| | | |
|---|---|---|
| 1,190,242 | Hill | July 4, 1916 |
| 2,562,163 | Hiensch et al. | July 31, 1951 |
| 2,593,507 | Wainer | Apr. 22, 1952 |
| 2,686,342 | D'Eustachio | Aug. 17, 1954 |
| 2,768,475 | Seelen et al. | Oct. 30, 1956 |